Patented Aug. 18, 1953

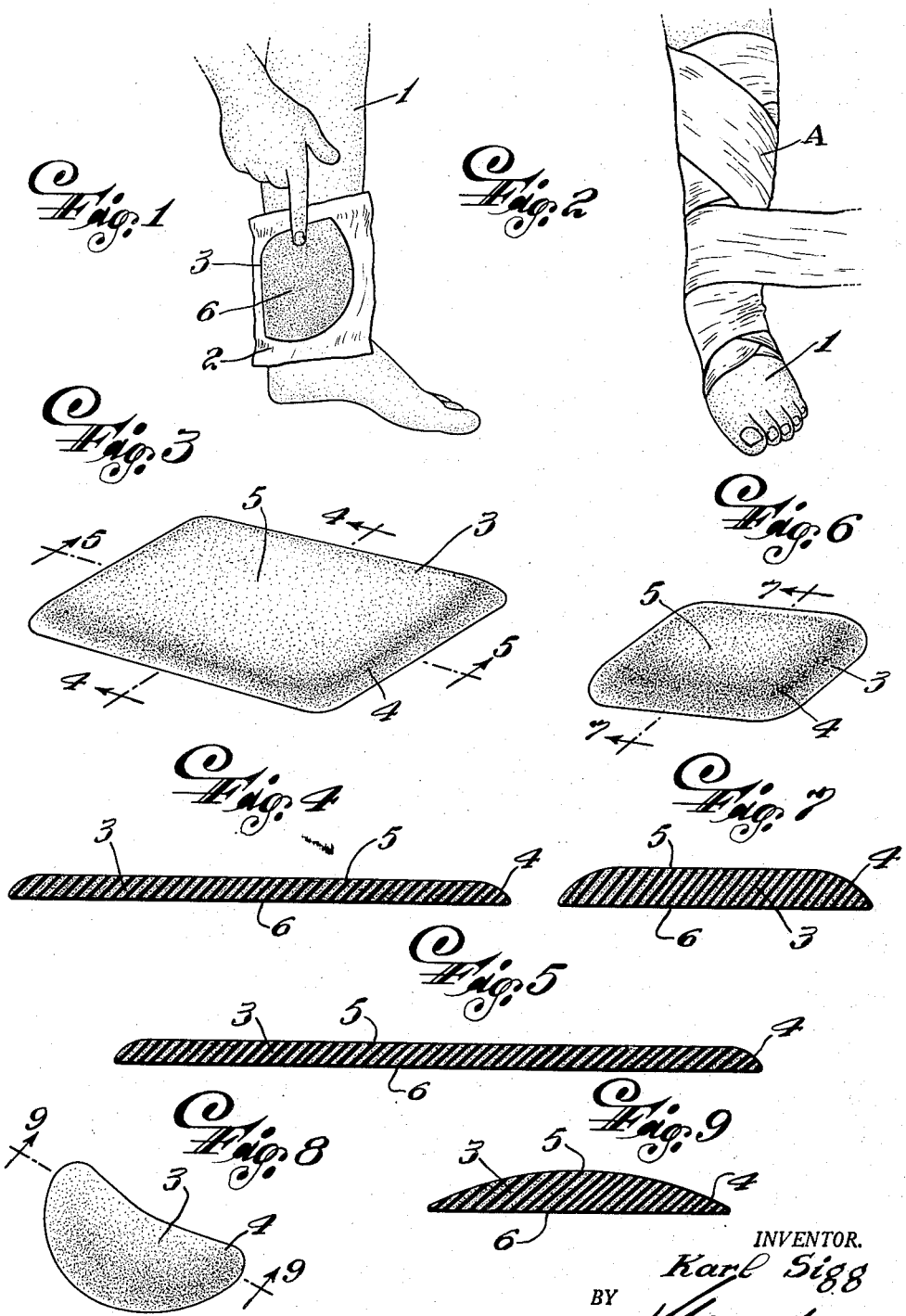

2,649,088

UNITED STATES PATENT OFFICE 2,649,088

MEANS FOR THE TREATMENT OF PHLEBITIS

Karl Sigg, Binningen, Switzerland, assignor to Medical Fabrics Co., Inc., Paterson, N. J., a corporation of New Jersey Application January 20, 1951, Serial No. 206,945

5 Claims. (Cl. 128—156)

This invention deals with a bandage combination useful in the treatment of phlebitis and diseases resulting therefrom or accentuated thereby. In particular this invention deals with a bandage combination for the treatment of ulcers of the leg and other diseases based on or affected by circulatory disturbances of the venous blood system.

A well known and effective method for treating phlebitis and other circulatory disturbances of the venous system involves, or includes, the utilization of compression bandages in the ambulatory pressure bandage therapy, in which the application of strong pressure to the legs is aimed at restoring normal circulation of the blood, by increasing the pumping action of the contractions of the skeletal muscles on the veins.

Heretofore, the application of the pressure has been effected by the use of elastic bandages, either non-adhesive or adhesive, with or without other underlying bandages. In some cases, the non-adhesive bandage has also been used in conjunction with an underlying layer of sponge rubber, the theory being that the porous rubber acts as a supplemental pump for the venous flow, in combination with the elastic bandage. The rubber padding has been known as "rubber or venous heart."

More specifically the present invention deals with an improvement in such combination of elastic bandage and rubber heart.

Referring to the drawings, forming part hereof, illustrating the nature of the invention, Fig. 1 represents a perspective view of the first step in the application of the combination of this invention, Fig. 2 represents a perspective view of the final step in the application of such combination, Fig. 3 represents a perspective view of one embodiment of the rubber component of my combination, Fig. 4 represents a cross-sectional view of Fig. 3 along the line 4—4 thereof, Fig. 5 represents a cross-sectional view of Fig. 3 along the line 5—5 thereof, Fig. 6 represents a perspective view of another embodiment of the rubber component of my invention, Fig. 7 represents a cross-sectional view of Fig. 6 along the line 7—7 thereof, Fig. 8 represents a perspective view of another embodiment of the rubber component of my invention, and Fig. 9 represents a cross-sectional view of the embodiment of Fig. 8 along the line 9—9 thereof.

Referring to Fig. 1, the ulcer or eczema or other part (not shown) of the leg 1 is covered with gauze or cotton padding 2, preferably after first having been treated with salve or ointment, and the rubber component 3 is placed thereon, followed by the application of the elastic bandage A, which may be either an elastic non-adhesive bandage or an elastic adhesive bandage. The utilization, in addition, of a moist medicated bandage under the rubber component is not excluded.

The rubber component 3 consists advantageously of soft foam rubber. Like other types of rubber padding heretofore employed in the pressure bandage therapy, the foam rubber component 3 supplements the action of the muscles in the pumping action effected on the venous system and to counteract the venous stasis and eliminate the resultant edema, and thus by decongestion cure the leg ulcer or eczema and the like.

The foam rubber pad constitutes an additional pump for the venous circulation, working, as it does, with every contraction of the muscles. When the muscle contracts, the rubber pad, which is held in place by the superimposed elastic bandage, e. g. cotton elastic bandage, can not expand to the outside and exerts a continuous, elastic, and yet soft, pressure upon the venous capillaries and presses them out. On relaxation of the muscles, the pad prevents the refilling of the underlying tissue space by itself expanding and filling out the empty space caused by the relaxation of the muscles, thus preventing a new blood stasis of the emptied capillaries. Also, the rubber component is an excellent pad for the tender spots of the ulcer or eczema, and, furthermore, protects the patient in case of accident. In some cases, e. g. in the large depressions around the ankle, and so forth, bandages alone do not cause sufficient compression, and the foam rubber component, forming part of the invention, serves additionally to fill in such depressions and thus making compression possible in such cases.

Foam rubber is far superior to sponge rubber in that it has a greater elasticity and resiliency than sponge rubber, although sponge rubber and the like can also be used. The rubber component, forming part of my invention, is characterized by a shaping designed to produce the best results in the pressure therapy described. It is preferably manufactured from natural latex, and has a sufficient consistency and mass or body to permit substantial compression and reexpansion or dilation.

The foam rubber components of my invention are more specifically shown in Figures 3-9. The component of Figs. 3-5 is substantially rectangular or oblong and relatively large, e. g. 8" x 10" and having a thickness of ⅜". The component, said elastic bandage overlying said flat base of Figs. 6-7 is somewhat smaller, e. g. 5" x 6½", with a thickness of ¾", also of suitable rectangular shape; and the component of Figs. 8-9 has a kidney-shape with a longest dimension of, e. g. 4½", and a shortest dimension of, e. g. about 2½", the thickness being, as an illustration, of the order of about ⅝".

In all cases the edges 4 of the component 3 are bevelled, sloped or rounded down smoothly and uniformly from the top or face 5, substantially flat in the embodiments of Figs. 3-5 and 6-7, to the flat base 6 of the component, as most clearly shown in Figs. 4, 5, 7 and 9.

As shown in Fig. 1 the component is applied with the bevelled edge 4 toward the leg 1 and the base 6 away from the leg. The foam rubber component is then adapted to adjust itself smoothly to the rounded contour of the leg without offering a thick edge to the overlying elastic bandage. In the absence of such bevelled edge, the pressure exerted by the elastic bandage forces the rubber component at its edge into the leg skin, creating therein a constriction.

The small kidney-shaped flat component of Figs. 8-9 is particularly designed for the treatment of ulcers and eczema in the vicinity of the ankle of a leg or other localized skin diseases. The larger flat component of Figs. 6-7 is designed for larger and deeper ulcerations, whereas the still larger flat component of Figs. 3-5 is for use in the case of large eczema, serious leg edemas, etc.

My experience in the treatment of ulcers, eczema, etc. has shown that a faster and better cure is obtained with the combination of my invention than with other combinations involving the use of sponge rubber or even foam rubber without bevelled edge.

The sponge or foam rubber components are preferably cast in a form so as to give assurance of the smoothest and most perfect curved bevel.

What I claim is:

1. In the combination of elastic bandage and a soft rubber component for the treatment of phlebitis, said rubber component being a substantially flat rubber component having a flat base and an opposite face and its edge sloped from the face to the base of the component, said elastic bandage overlying said flat base.

2. In the combination of elastic bandage and a foam rubber component, the rubber component having a flat base, a substantially flat face opposite therefrom having a bevelled edge, said elastic bandage overlying said flat base.

3. In the combination of an elastic bandage and a soft rubber component for the treatment of phlebitis, said rubber component being a substantially flat rubber component having a flat base and an opposite face and its edge bevelled from the face to the base of the component, said elastic bandage overlying said flat base, the soft rubber component being substantially kidney shaped.

4. The combination of an elastic bandage and a soft rubber component, said rubber component consisting of foam rubber having a flat base and a face opposite therefrom with all its edges bevelled from said face to said base, said elastic bandage overlying said flat base.

5. The combination according to claim 4, wherein said edges terminate in said flat base, the said elastic bandage overlying the entire said flat base.

KARL SIGG.

References Cited in the file of this patent

UNITED STATES PATENTS

| Number | Name | Date |
|---|---|---|
| 1,984,158 | Scholl | Dec. 11, 1934 |
| 2,449,410 | Polinsky | Sept. 14, 1948 |
| 2,461,047 | Freedman | Feb. 8, 1949 |
| 2,475,417 | Wysowski | July 5, 1949 |
| 2,560,712 | Bell | July 17, 1951 |
| 2,573,363 | Ruddick | Oct. 30, 1951 |

FOREIGN PATENTS

| Number | Country | Date |
|---|---|---|
| 584,150 | Great Britain | Jan. 17, 1947 |

OTHER REFERENCES

"Varicose Ulcers"; "Surgery, Gynecology and Obstetrics," vol. 52, 1931, pp. 1164-1169. A copy of this publication is available at the Scientific Library of the Patent Office.